US012321746B2

(12) United States Patent
Gonion et al.

(10) Patent No.: US 12,321,746 B2
(45) Date of Patent: *Jun. 3, 2025

(54) DSB OPERATION WITH EXCLUDED REGION

(71) Applicant: Apple Inc., Cupertino, CA (US)

(72) Inventors: Jeff Gonion, Campbell, CA (US); John H. Kelm, Belmont, CA (US); James Vash, San Ramon, CA (US); Pradeep Kanapathipillai, Santa Clara, CA (US); Mridul Agarwal, Saratoga, CA (US); Gideon N. Levinsky, Cedar Park, TX (US); Richard F. Russo, Saratoga, CA (US); Christopher M. Tsay, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,704

(22) Filed: Jun. 16, 2023

(65) Prior Publication Data
US 2023/0333851 A1 Oct. 19, 2023

Related U.S. Application Data

(63) Continuation of application No. 17/469,504, filed on Sep. 8, 2021, now Pat. No. 11,720,360.
(Continued)

(51) Int. Cl.
G06F 9/30 (2018.01)
G06F 9/38 (2018.01)
(Continued)

(52) U.S. Cl.
CPC ...... G06F 9/30087 (2013.01); G06F 9/30043 (2013.01); G06F 9/30047 (2013.01);
(Continued)

(58) Field of Classification Search
CPC ............ G06F 9/30087; G06F 9/30043; G06F 9/3834; G06F 9/30101; G06F 9/3851;
(Continued)

(56) References Cited

U.S. PATENT DOCUMENTS 6,678,810 B1    1/2004  Palanca et al.
6,708,269 B1 *  3/2004  Tiruvallur ............ G06F 9/3004
                                                      712/E9.046
(Continued)

FOREIGN PATENT DOCUMENTS

KR    1020100022483 A    3/2010
KR    1020200101943 A    8/2020

OTHER PUBLICATIONS

International Search Report and Written Opinion in PCT Appl. No. PCT/US2021/049750 mailed Dec. 22, 2021, 12 pages.
(Continued)

Primary Examiner — Andrew Caldwell
Assistant Examiner — Kasim Alli
(74) Attorney, Agent, or Firm — Kowert, Hood, Munyon, Rankin & Goetzel, P.C.; Mark D. Seegers; Dean M. Munyon

(57) ABSTRACT

Techniques are disclosed relating to data synchronization barrier operations. A system includes a first processor that may receive a data barrier operation request from a second processor include in the system. Based on receiving that data barrier operation request from the second processor, the first processor may ensure that outstanding load/store operations executed by the first processor that are directed to addresses outside of an exclusion region have been completed. The first processor may respond to the second processor that the data barrier operation request is complete at the first processor, even in the case that one or more load/store operations that are directed to addresses within the exclusion
(Continued)

region are outstanding and not complete when the first processor responds that the data barrier operation request is complete.

21 Claims, 8 Drawing Sheets

Related U.S. Application Data

(60) Provisional application No. 63/077,385, filed on Sep. 11, 2020.

(51) Int. Cl.
*G06F 12/02* (2006.01)
*G06F 12/0875* (2016.01)

(52) U.S. Cl.
CPC ........ *G06F 9/30101* (2013.01); *G06F 9/3834* (2013.01); *G06F 12/0238* (2013.01); *G06F 12/0875* (2013.01)

(58) Field of Classification Search
CPC .... G06F 9/3877; G06F 9/3885; G06F 9/3854; G06F 9/38; G06F 9/3858; G06F 9/522; G06F 2009/3883
See application file for complete search history.

(56) References Cited

U.S. PATENT DOCUMENTS

| | | | |
|---|---|---|---|
| 6,748,518 | B1 | 6/2004 | Guthrie et al. |
| 7,552,302 | B1 | 6/2009 | Tene et al. |
| 8,368,701 | B2 | 2/2013 | Paltashev et al. |
| 8,930,636 | B2 | 1/2015 | McCormack et al. |
| 9,218,222 | B2 | 12/2015 | Solinas et al. |
| 9,442,755 | B2 | 9/2016 | Lindholm et al. |
| 12,073,222 | B2* | 8/2024 | Gogte ............... G06F 9/522 |
| 12,141,626 | B2* | 11/2024 | Dupont de Dinechin ............... G06F 9/54 |
| 2002/0169947 | A1 | 11/2002 | Bilardi et al. |
| 2002/0194436 | A1* | 12/2002 | McKenney ........ G06F 9/3834 711/152 |
| 2004/0083343 | A1 | 4/2004 | Mithal et al. |
| 2006/0212868 | A1* | 9/2006 | Takayama ........ G06F 9/522 718/100 |
| 2007/0150675 | A1 | 6/2007 | Arimilli et al. |
| 2019/0303295 | A1 | 10/2019 | Steinmacher-Surow |
| 2019/0347102 | A1 | 11/2019 | Okazaki |
| 2020/0026513 | A1* | 1/2020 | Akin ............... G06F 9/3004 |

OTHER PUBLICATIONS

Notice of Allowance in Korean Appl. No. 10-2023-7008732 mailed Jul. 15, 2024, 4 pages.

* cited by examiner

DSB OPERATION WITH EXCLUDED REGION

RELATED APPLICATIONS

The present application is a continuation of U.S. application Ser. No. 17/469,504, entitled "DSB Operation with Excluded Region," filed Sep. 8, 2021, which claims priority to U.S. Provisional Appl. No. 63/077,385, entitled "DSB Operation with Excluded Region," filed Sep. 11, 2020; the disclosures of each of the above-referenced applications are incorporated by reference herein in their entireties. To the extent that the incorporated material contradicts material expressly set forth herein, the expressly set forth material controls.

BACKGROUND

Technical Field

This disclosure relates generally to an integrated circuit and, more specifically, to data synchronization barrier (DSB) operations.

Description of the Related Art

Modern computer systems usually include multiple processors that are coupled to various memory devices (e.g., random access memory (RAM), a graphics processing unit having its own memory, etc.). During operation, those processors execute instructions to implement various software routines, such as user software applications and an operating system. As part of implementing those software routines, the processors often retrieve data, manipulate the data, and then store that data back to one of the various memory devices coupled to the processors. To manage data, a processor executes load/store operations. Load operations read data from a memory device into a processor while store operations write data from the processor to a memory device (although implementations that include caches may complete a given load or store operation in the cache). As an example, a processor might execute a load operation to read data from a peripheral device (e.g., a network card) into the processor.

SUMMARY

Various embodiments relating to implementing a DSB operation that can be completed without having to complete all outstanding load/store operations that target a defined exclusion memory region are disclosed. Generally speaking, a system on a chip (SOC) comprises processors that are configured to execute load/store operations that may involve issuing requests for data to an external memory, such as a memory of a peripheral device and/or system memory. During operation, a first processor may issue a DSB operation request to a second processor in response to executing a data barrier instruction. Based on receiving the DSB operation request from the first processor, the second processor may ensure that outstanding load/store operations executed by the second processor that are directed to addresses outside of an exclusion region have been completed. In some cases, the exclusion region is mapped to the memory space of a peripheral device. The second processor may respond back to the first processor that the DSB operation request is complete at the second processor, even in the case that one or more load/store operations directed to addresses within the exclusion region are outstanding and not complete when the second processor responds that the DSB operation request is complete. In some instances, while processing the DSB operation request, the second processor may receive another DSB operation request from another processor and that DSB operation may be of a different type than the DSB operation requested by the first processor. The second processor may process those DSB operations in parallel based them corresponding to different types of DSB operations.

DETAILED DESCRIPTION

Figure 1:
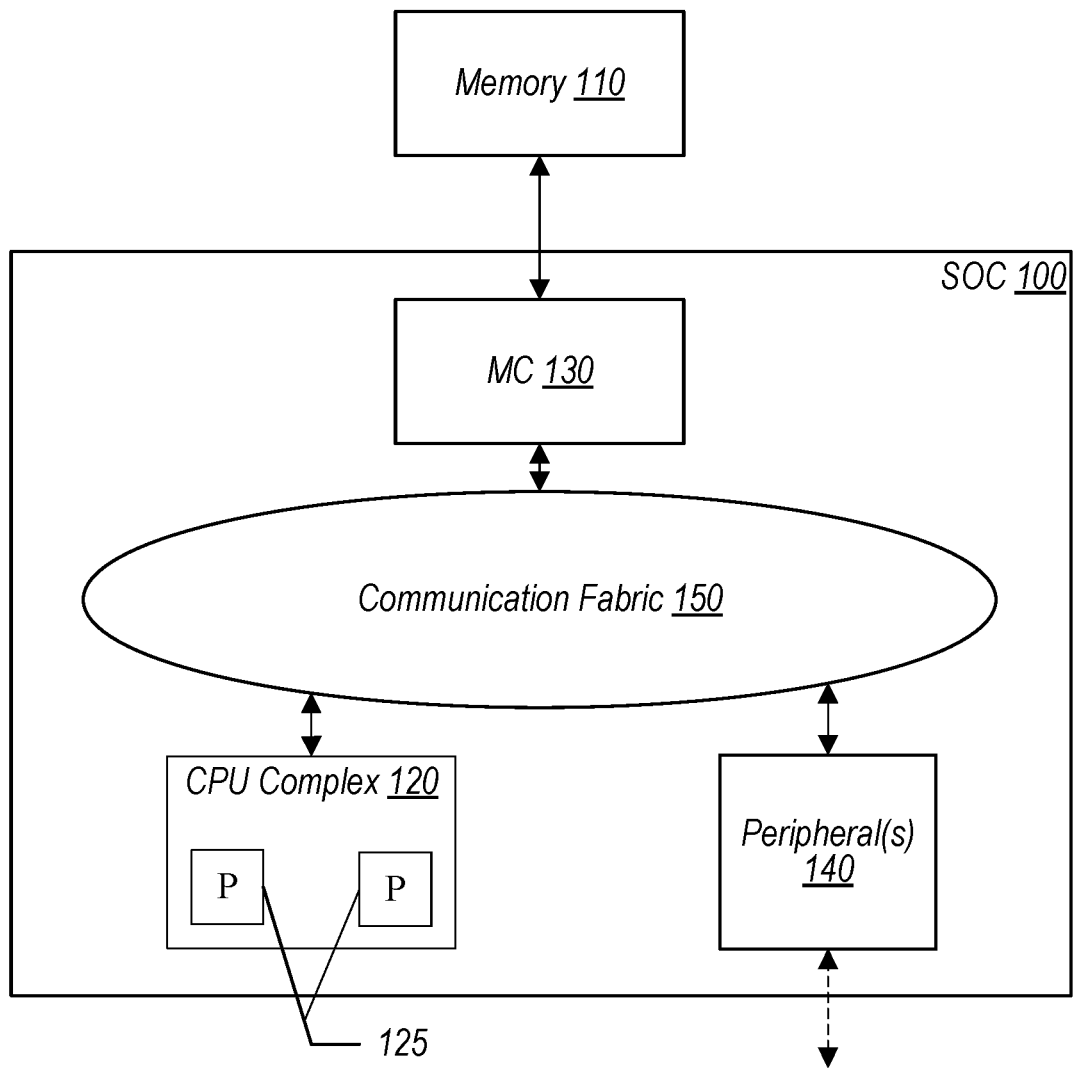
FIG. 1 is a block diagram illustrating example elements of a system on a chip (SOC) that is coupled to a memory, according to some embodiments.

In many cases, when a processor makes a local change (e.g., remaps a translation page and invalidates entries of a translation lookaside buffer (TLB)), the processor has to ensure that the effects of the change are realized and accounted for by other processors in a system. In order to ensure that the effects of a change are realized, a processor can execute a data synchronization barrier (DSB) instruction that causes that processor along with other processors to complete all of their outstanding load/store operations and other memory-affecting instructions, such as TLB invalidate instructions that invalidate entries of the TLB. In some cases, the DSB-initiating processor ensures that its own outstanding load/store operations and other memory-affecting instructions have completed (in program order) before it broadcasts a DSB operation request out to the other processors. In response to receiving the DSB operation request, the other processors complete their outstanding load/store operations and other memory-affecting instructions before sending an acknowledgment back to the DSB-initiating processor.

But in some cases, at least one of the outstanding load/store operations of a processor that receives the DSB operation from the DSB-initiating core (e.g., a "receiving processor") may take a long time to complete. Since the load/store operation is outstanding, it would normally need to be completed before completing the DSB operation. For example, a processor might issue, as part of a load/store operation, a data request to a target device that takes a long time to respond (e.g., a non-responding target device might cause a 50 millisecond delay) for various reasons, such as hot unplug, power-up/down of the peripheral component interconnect express (PCIe) link to the target device, etc. Because the load/store operation takes a long time to complete, the processor is reasonably delayed in acknowledging completion of the DSB operation to the DSB-initiating processor. Since the DSB-initiating processor does not resume its normal execution until after it receives a completion acknowledgement from that other processor, the DSB-initiating processor is negatively impacted (suffers the long delay) due to a long latency data request that was issued by the other processor. This disclosure addresses, among other things, this technical problem of the DSB-initiating processor being negatively impacted due to long latency operations by other processors.

The present disclosure describes various techniques for implementing a DSB operation that can be completed without having to complete all the outstanding load/store operations that target a particular address space. As used herein, this DSB operation is referred to as a "mild DSB operation" or simply a "mild DSB." This stands in contrast to the "strong DSB operation" or "strong DSB" described above in which all the outstanding load/store operations have to be completed before the strong DSB operation. Broadly speaking, a DSB operation is considered a type of synchronizing instruction (sometimes referred to as a "barrier" or "fence" instruction) that enables multiple processors in a system to share a consistent and coherent view of shared memory (e.g., in order to avoid race conditions or other situations in which a processor's view of memory contents is dependent upon the possibly unpredictable order in which memory operations are completed). Strong types of synchronizing instructions (e.g., strong DSB) typically treat all the outstanding load/store operations as equivalent in their potential to visibly affect memory state. By requiring all such operations to complete before processing is allowed to continue, strong synchronizing instructions provide maximal assurance regarding memory assurance at the potential expense of performance. By contrast, differentiating among outstanding load/store operations may enable the identification of certain load/store operations that do not need to be stringently ordered to preserve correct program execution. "Weakened" or "relaxed" synchronizing instructions, such as a mild DSB, may take advantage of these distinctions to improve performance while preserving correctness.

In various embodiments described below, a system includes a set of processors that are coupled to a set of memory devices. The processors are configured to execute various instructions, including load/store instructions to load data from or store data at those memory devices along with other memory-affecting instructions. The processors, in various embodiments, are configured to execute DSB instructions to cause a set of processors of the system to perform a DSB operation. A DSB instruction may be executed by a processor in response to the occurrence of any of various events. For example, a processor may invalidate page mappings, affecting other processors that are caching those mappings. Consequently, the processor may execute a DSB instruction to globally synchronize the invalidations among the processors of the system. A processor may execute one of two DSB instructions based on whether the memory-affecting instructions (e.g., page mapping invalidations) affect memory addresses corresponding to a particular memory region. If a processor determines that the memory-affecting instructions are not associated with a particular memory region, then the processor may execute a first type of DSB instruction to cause other processors to perform a mild DSB operation; otherwise, the processor may execute a second type of DSB instruction to cause other processors to perform a strong DSB operation.

In response receiving a DSB operation request to perform a mild DSB operation, in various embodiments, a processor ensures that outstanding load/store operations executed by the processor that target memory addresses outside of a particular memory region are completed before completing the mild DSB operation. The processor, however, does not ensure that outstanding load/store operations that target addresses within the particular memory region have completed before completing the mild DSB operation. In some cases, the particular memory region may correspond to memory addresses that are associated with a PCIe address space. As a result, the processor does not wait for outstanding load/store operations that target a PCIe address to complete before acknowledging back to the DSB-initiating processor. In response receiving a DSB operation request to perform a strong DSB operation instead of a mild DSB operation, in various embodiments, a processor ensures that all outstanding load/store operations that are executed by the processor are completed before completing the strong DSB operation. In some embodiments, a processor may receive a strong DSB operation request and a mild DSB operation request at relatively the same time. The processor may process those DSB operation requests at least partially in parallel such that the mild DSB operation can complete before the strong DSB operation even if the mild DSB operation request was received second.

The techniques of this present disclosure are advantageous over prior approaches as the techniques allow for the DSB-initiating processor to not be negatively impacted by a long latency operation that is initiated by another processor as that operation can be excluded from having to be completed before the DSB operation is completed. For example, load/store operations that target PCIe addresses can be excluded as those operations are more susceptible to long latencies. As a result, the DSB-initiating processor is not prevented from resuming normal execution by a long latency PCIe-associated load/store operation. The techniques also provide additional advantages by allowing multiple DSB operations to be performed at least partially in parallel by a processor so that a mild DSB operation is not blocked by a strong DSB operation that is received and initiated first. That is, by allowing parallelism, the benefits of a mild DSB operation are not rendered moot, which could result if the mild DSB operation were to be blocked by a long-latency strong DSB operation. An example application of these techniques will now be discussed, starting with reference to FIG. 1.

Turning now to FIG. 1, a block diagram of an example system on a chip (SOC) 100 that is coupled to a memory 110 is shown. As implied by the name, the components of SOC 100 can be integrated onto a single semiconductor substrate as an integrated circuit "chip." In some embodiments, the components are implemented on two or more discrete chips in a computing system. In the illustrated embodiment, the components of SOC 100 include a central processing unit (CPU) complex 120, a memory controller (MC) 130, one or more peripheral components 140 (more briefly, "peripherals"), and a communication fabric 150. Components 120, 130, and 140 are all coupled to communication fabric 150 as depicted, and memory controller 130 may be coupled to memory 110 during use. Also as shown, CPU complex 120 includes at least two processors 125 (P 125 in FIG. 1). In some embodiments, SOC 100 is implemented differently than shown. For example, SOC 100 may include an "always-on" component, a display controller, a power management circuit, etc. It is noted that the number of components of SOC 100 (and the number of subcomponents for those shown in FIG. 1, such as within the CPU complex 120) may vary between embodiments. Accordingly, there may be more or fewer of each component or subcomponent than the number shown in FIG. 1.

Memory 110, in various embodiments, is usable to store data and program instructions that are executable by CPU complex 120 to cause a system having SOC 100 and memory 110 to implement operations described herein. Memory 110 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 100 is not limited to primary storage such as memory 110. Rather, SOC 100 may further include other forms of storage such as cache memory (e.g., L1 cache, L2 cache, etc.) in CPU complex 120.

CPU complex 120, in various embodiments, includes a set of processors 125 that may serve as the CPU of the SOC 100. Processors 125 may execute the main control software of the system, such as an operating system. Generally, software executed by the CPU during use control the other components of the system in order to realize the desired functionality of the system. Processors 125 may further execute other software, such as application programs. The application programs may provide user functionality, and may rely on the operating system for lower-level device control, scheduling, memory management, etc. Consequently, processors 125 may also be referred to as application processors. CPU complex 120 may further include other hardware such as an L2 cache and/or an interface to the other components of the system (e.g. an interface to communication fabric 150).

A processor 125, in various embodiments, includes any circuitry and/or microcode that is configured to execute instructions defined in an instruction set architecture implemented by that processor 125. A processor 125 may be implemented on an integrated circuit with other components of SOC 100. The processors 125 may share a common last level cache (e.g., an L2 cache) while including their own respective caches (e.g., an L0 cache and an L1 cache) for storing data and program instructions. As discussed with respect to FIG. 2, processors 125 may communicate with each other through circuitry included in the common last level cache. For example, a processor may issue a DSB operation request to another processor via the common last level cache to cause that other processor to implement a DSB operation. Processors 125 may further encompass discrete microprocessors, processors and/or microprocessors integrated into multichip module implementations, processors implemented as multiple integrated circuits, etc.

Memory controller 130, in various embodiments, includes circuitry that is configured to receive, from the other components of SOC 100, memory requests (e.g., load/store requests) to perform memory operations, such as accessing data from memory 110. Memory controller 130 may be configured to access any type of memory 110, such as those discussed earlier. In various embodiments, memory controller 130 includes queues for storing memory operations, for ordering and potentially reordering the operations and presenting the operations to memory 110. Memory controller 130 may further include data buffers to store write data awaiting write to memory 110 and read data awaiting return to the source of a memory operation. In some embodiments, memory controller 130 may include a memory cache to store recently accessed memory data. In SOC implementations, for example, the memory cache may reduce power consumption in SOC 100 by avoiding re-access of data from memory 110 if it is expected to be accessed again soon. In some cases, the memory cache may also be referred to as a system cache, as opposed to private caches (e.g., L1 caches) in processors 125 that serve only certain components. But, in some embodiments, a system cache need not be located within memory controller 130.

Peripherals 140, in various embodiments, are sets of additional hardware functionality included in SOC 100. For example, peripherals 140 may include video peripherals such as an image signal processor configured to process image capture data from a camera or other image sensor, GPUs, video encoder/decoders, scalers, rotators, blenders, display controllers, etc. As other examples, peripherals 140 may include audio peripherals such as microphones, speakers, interfaces to microphones and speakers, audio processors, digital signal processors, mixers, etc. Peripherals 140 may include interface controllers for various interfaces external to SOC 100, such as Universal Serial Bus (USB), peripheral component interconnect (PCI) including PCI Express (PCIe), serial and parallel ports, etc. The interconnection to external devices is illustrated by the dashed arrow in FIG. 1 that extends external to SOC 100. Peripherals 140 may include networking peripherals such as media access controllers (MACs).

Communication fabric 150 may be any communication interconnect and protocol for communicating among the components of SOC 100. For example, communication fabric 150 may enable processors 125 to issue and receive requests from peripherals 140 to access, store, and manipulate data. In some embodiments, Communication fabric 150 is bus-based, including shared bus configurations, cross bar configurations, and hierarchical buses with bridges. In some embodiments, communication fabric 150 is packet-based, and may be hierarchical with bridges, cross bar, point-to-point, or other interconnects.

Figure 2:
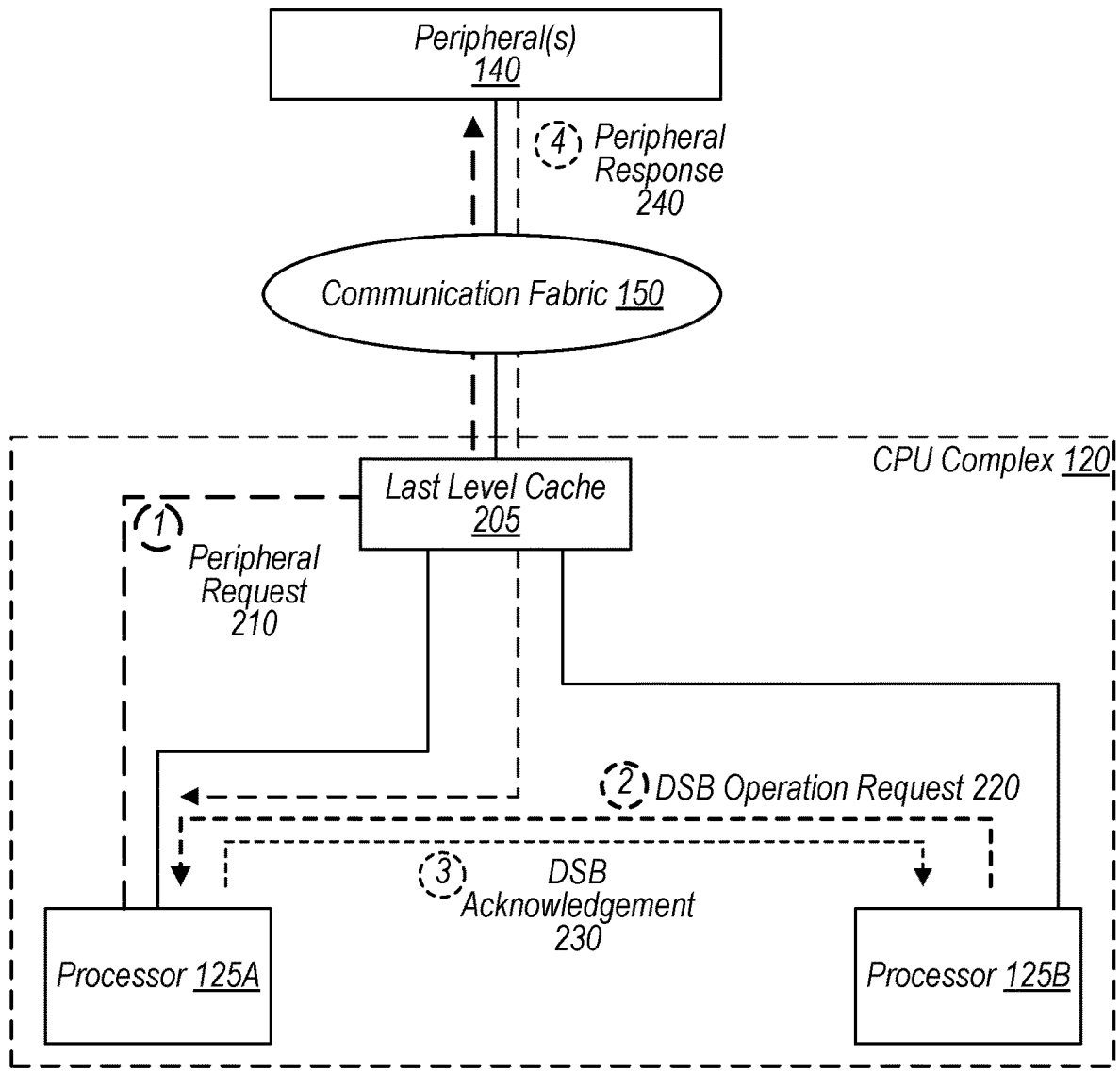
FIG. 2 is a block diagram illustrating example elements of an interaction between two processors that involves a DSB operation, according to some embodiments.

Turning now to FIG. 2, a block diagram of an example DSB-based interaction between two processors 125 in a CPU complex 120 is shown. In the illustrated embodiment, there is CPU complex 120 and a set of peripherals 140, all of which are coupled to communication fabric 150. Also as shown, CPU complex 120 includes processors 125A-B that are coupled to a last level cache 205. While processor 125A-B are illustrated as being within the same CPU complex 120, in some embodiments, they are part of different CPU complexes 120 of SOC 100. Furthermore, while two processors 125 are illustrated, CPU complex 120 may include more processors 125 that are involved in the DSB-based interaction.

In the illustrated embodiment, processor 125A initially issues, to a peripheral 140 via last level cache 205 and communication fabric 150, a peripheral request 210 that is associated with a load/store operation. That peripheral request 210 may be a request to store data at a specified memory address or a request for data stored at the specified memory address at the peripheral 140. As shown in FIG. 2, that peripheral request 210 travels through last level cache 205 and communication fabric 150. Last level cache 205, in various embodiments, corresponds to the highest level cache that is included in CPU complex 120. For example, last level cache 205 might be an L2 cache. In many cases, when a peripheral request 210 is a request for data, last level cache 205 may be checked for the requested data before sending the peripheral request 210 to the corresponding peripheral 140 if the data is not located at last level cache 205. In various embodiments, last level cache 205 includes circuitry for interfacing with processors 125 to facilitate the management of local caches within those processors 125—e.g., such circuitry may be configured to cause processors 125 to invalidate certain portions of their local caches in order to ensure cache coherency among those processors 125. Last level cache 205 may further include circuitry for ensuring cache coherency among processors 125 that are included in other CPU complexes 120 of SOC 100.

While processor 125A is waiting for a peripheral response 240 from the peripheral 140, processor 125A may receive a DSB operation request 220 from processor 125B to perform a DSB operation. While DSB operation request 220 is depicted as traveling directly from processor 125B to processor 125A, in many cases, DSB operation request 220 is sent to last level cache 205, which routes that DSB operation request 220 to processor 125A. In various embodiments, processor 125B issues the DSB operation request 220 in response to executing a corresponding DSB instruction. The DSB instruction may be executed after the occurrence of an event for which a global synchronization is desired. As an example, after locally performing a set of TLB invalidates, processor 125B may then execute a DSB instruction in order to globally synchronize those TLB invalidates among other processors 125.

In various embodiments, there are two DSB instructions: one for initiating a mild DSB operation and one for initiating a strong DSB operation. Whether a mild DSB instruction or a strong DSB instruction is executed may depend on whether the global synchronization affects a certain memory region. In some embodiments, the operating system makes the determination on whether that memory region is affected. As an example, remappings of translation pages in the device address space for PCIe or another such interface may be performed by an operating system routine. Consequently, the operating system can determine that the PCIe address space is being affected by the remappings and then cause a strong DSB operation to occur. But if the remappings (or other memory-affecting operations) are not directed to the PCIe address space, then the operating system can cause a mild DSB operation to be performed in which load/store operations directed to that memory address region are excluded from having to be completed before the mild DSB operation. In some cases, the operating system may set a bit that indicates whether a mild or strong DSB operation is to be performed.

Based on receiving a DSB operation request 220 from processor 125B to perform a mild DSB operation, processor 125A may ensure that outstanding load/store operations directed to memory addresses outside of a defined excluded memory address region have been completed. In some embodiments, a processor 125 includes one or more registers that are programmable to define the excluded memory address region. If the issued peripheral request 210 is directed to a memory address that falls within the excluded memory address region, then processor 125A does not wait for a peripheral response 240 before completing the mild DSB operation. In various embodiments, a processor 125 determines whether a load/store operation (which may correspond to a peripheral request 210) is directed to a memory address that falls within the excluded memory address region based on a memory address comparison. If the memory address is within the excluded memory address region, then a bit may be set for the load/store operation, indicating that the load/store operation is associated with the excluded memory address region. As such, a processor 125 may ensure that there are no outstanding load/store operations directed to addresses outside of the excluded memory address region by ensuring that there are only outstanding load/store operations that have that bit set.

After ensuring that the outstanding load/store operations directed to memory addresses outside of the excluded memory address region have been completed, in various embodiments, processor 125A sends a DSB acknowledgement 230 to processor 125B that indicates that the mild DSB operation is complete. The DSB acknowledgement 230 may be sent without receiving a peripheral response 240. As shown in the illustrated embodiment for example, after sending DSB acknowledgement 230, processor 125A receives peripheral response 240 from peripheral 140. Peripheral response 240 may include data and/or an acknowledgement that peripheral request 210 has been processed. For the cases in which a DSB operation request 220 to perform a strong DSB operation is received, processor 125A may ensure that all outstanding load/store operations are completed before completing the strong DSB operation. Consequently, processor 125A waits for peripheral response 240 (or an indication that the associated load/store operation cannot be completed) before sending DSB acknowledgement 230 to processor 125B.

Figure 3:
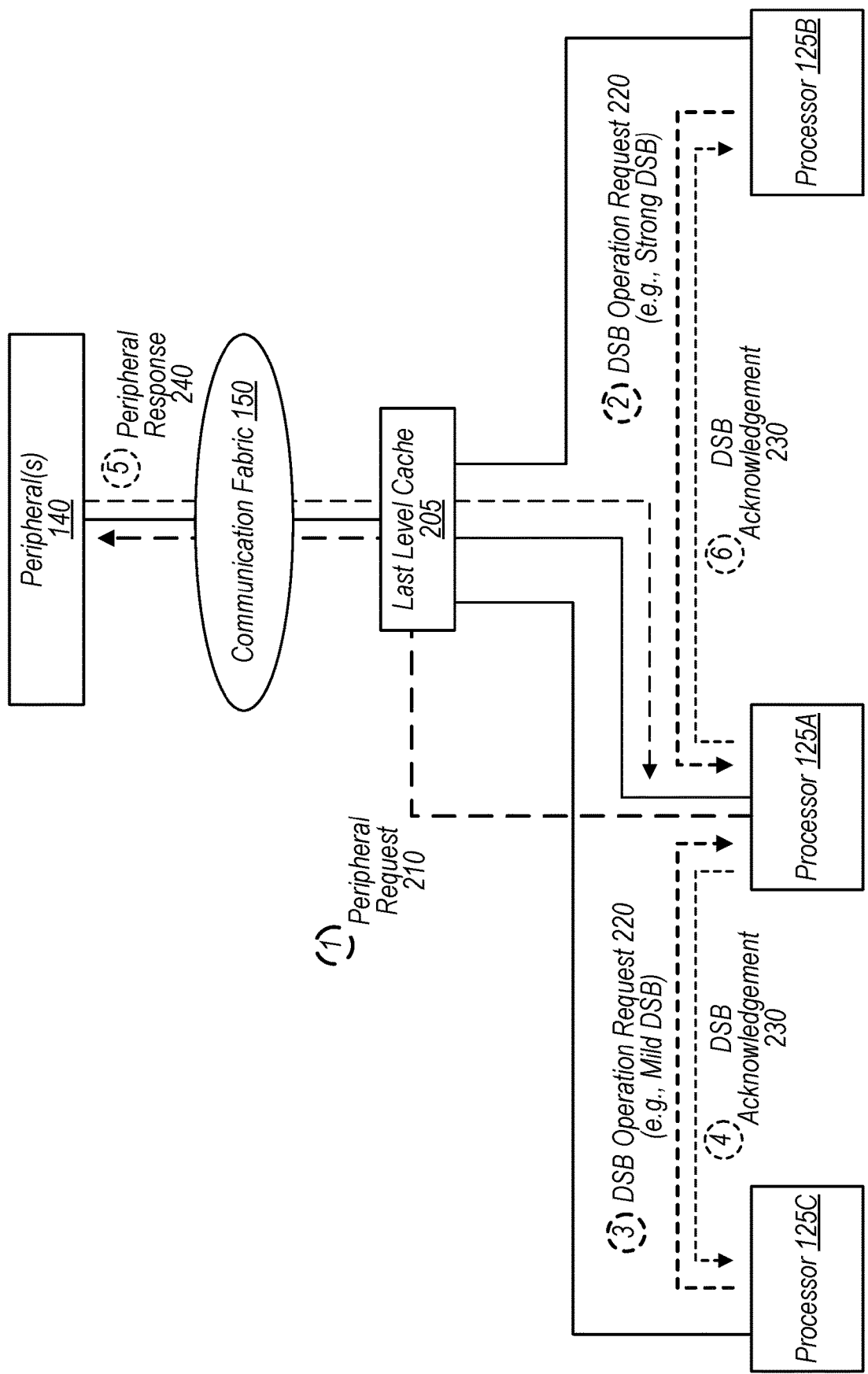
FIG. 3 is a block diagram illustrating example elements of an interaction between three processors that involves concurrent DSB operations, according to some embodiments.

Turning now to FIG. 3, a block diagram of an example DSB-based interaction between processors 125 is shown. In the illustrated embodiment, there are processors 125A-C, last level cache 205, a set of peripherals 140, and communication fabric 150. Also as shown, processors 125A-C are coupled to last level cache 205 while last level cache 205 and the set of peripherals 140 are coupled to communication fabric 150. In some cases, processors 125A-C may be included in the same CPU complex 120 while, in other cases, one or more of those processors 125 may be a part of another CPU complex 120.

In the illustrated embodiment, processor 125A initially issues, to a peripheral 140 via last level cache 205, a peripheral request 210 that is associated with a load/store operation. After issuing that peripheral request 210, processor 125A then receives a DSB operation request 220 from processor 125B to perform a strong DSB operation, as depicted. While performing the strong DSB operation, processor 125A receives a DSB operation request 220 from processor 125C to perform a mild DSB operation. In various embodiments, a processor 125 is configured to concurrently process a strong DSB operation and a mild DSB operation. The concurrent processing of those DSB operations may be done via separate and independent cones of logic. As a result, a mild DSB operation request 220 that is received after a strong DSB operation request 220 can be completed without waiting for the strong DSB operation request 220 to be completed first. As shown, before receiving a peripheral response 240 so that the strong DSB operation request 220 can be completed, processor 125A sends a DSB acknowledgement 230 to processor 125C that the requested mild DSB operation has been completed. Thereafter, processor 125A receives peripheral response 240 and then sends a DSB acknowledgement 230 to processor 125B, completing the strong DSB operation request 220.

A processor 125, however, may be configured to process DSB operation requests 220 of the same type (e.g., mild) in a serial fashion. Thus, for example, if processor 125A were to receive another mild DSB operation request 220 while the mild DSB operation request 220 from processor 125C was still being processed, then processor 125A may wait until the mild DSB operation request 220 from processor 125C has completed before then processing the newly received mild DSB operation request 220. In various embodiments, a processor 125 includes one or more queues for storing DSB operation requests 220 that are waiting on a DSB operation request 220 of the same type to be completed. As an example, a processor 125 may include a queue for strong DSB operation requests 220 and a queue for mild DSB operation requests 220.

Figure 4:
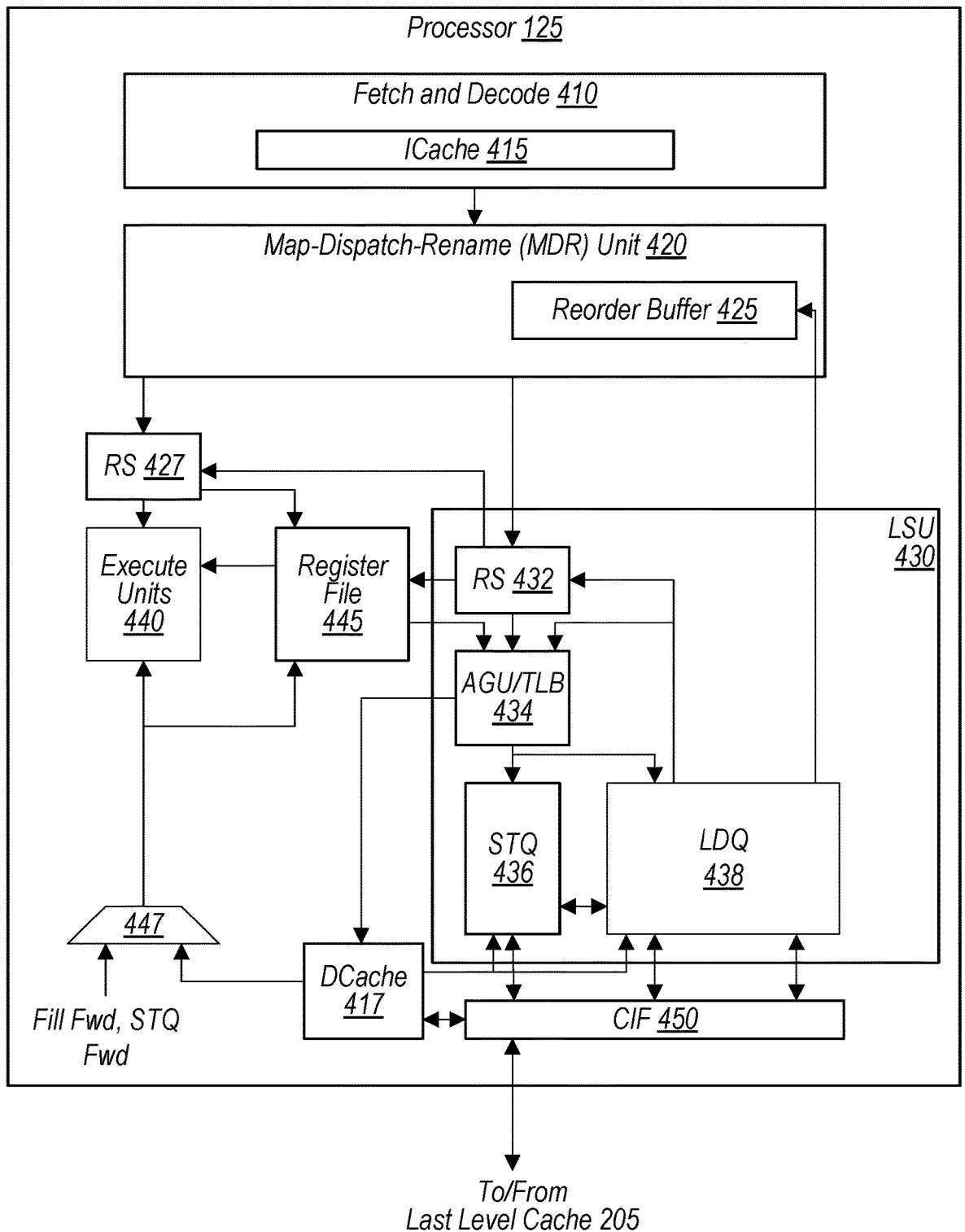
FIG. 4 is a block diagram illustrating example elements of a processor configured to implement DSB operations, according to some embodiments.

Turning now to FIG. 4, a block diagram of an example processor 125 is shown. In the illustrated embodiment, processor 125 includes a fetch and decode unit 410 (including an instruction cache, or "ICache", 415), a map-dispatch-rename (MDR) unit 420 (including a reorder buffer 425), a set of reservation stations (RSs) 427 and 432, one or more execute units 440, a register file 445, a data cache (DCache) 417, a load/store unit (LSU) 430, and a core interface unit (CIF) 450. As illustrated, fetch and decode unit 410 is coupled to MDR unit 420, which is coupled to RS 427 and LSU 430. More particularly, MDR unit 420 is coupled to an RS 432 in LSU 430. RS 427 is coupled to execute units 440, and reorder buffer 425 is coupled to a load queue (LDQ) 438 in LSU 430. Also as shown, register file 445 is coupled to execute units 440 and LSU 430 (more particularly, RS 432 and an address generation unit/translation lookaside buffer (AGU/TLB) 434). AGU/TLB 434 is coupled to DCache 417, which is coupled to CIF 450 and to a multiplexor 447 that is coupled to execute units 440 and register file 445. Another input of multiplexor 447 is coupled to receive other data (e.g. fill forward data from CIF 450 and/or forward data from a store queue 436 (STQ 436) in LSU 430. DCache 417 is further coupled to STQ 436 and LDQ 438 in LSU 430. AGU/TLB 434 is coupled to RS 432, STQ 436, and LDQ 438. STQ 436 is coupled to LDQ 438. STQ 436 and LDQ 438 are coupled to CIF 450.

Fetch and decode unit 410, in various embodiments, is configured to fetch instructions for execution by processor 125 and decode those instructions into instructions operations (briefly "ops") for execution. More particularly, fetch and decode unit 410 may be configured to cache instructions fetched from memory (e.g., memory 110) through CIF 450 in ICache 415, and may be configured to fetch a speculative path of instructions for processor 125. Fetch and decode unit 410 may implement various prediction structures for predicting the fetch path, such as one that predicts fetch addresses based on previously executed instructions. Fetch and decode unit 410 may be configured to decode the instructions into ops. In some embodiments, an instruction may be decoded into one or more instruction ops, depending on the complexity of the instruction. Particularly complex instructions may be microcoded. In such embodiments, the microcode routine for the instruction may be coded in ops. In other embodiments, however, each instruction in the instruction set architecture implemented by processor 125 may be decoded into a single op, and thus the op can be synonymous with instruction (although it may be modified in form by the decoder).

ICache 415 and DCache 417, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g. 32 bytes, 64 bytes, or larger or smaller). Different caches may have different cache line sizes. There may further be more additional levels of cache between ICache 415/DCache 417 and the main memory, such as last level cache 205. In various embodiments, ICache 415 is used to cache fetched instructions and DCache 417 is used to cache data fetched or generated by processor 125.

MDR unit 420, in various embodiments, is configured to map ops received from fetch and decode unit 410 to speculative resources (e.g. physical registers) in order to permit out-of-order and/or speculative execution. As shown, MDR unit 420 can dispatch the ops to RS 427 and RS 432 in LSU 430. The ops may be mapped to physical registers in register file 445 from the architectural registers used in the corresponding instructions. That is, register file 445 may implement a set of physical registers that are greater in number than the architectural registers specified by the instruction set architecture implemented by processor 125. MDR unit 420 may manage a mapping between the architectural registers and the physical registers. In some embodiments, there may be separate physical registers for different operand types (e.g. integer, floating point, etc.). The physical registers, however, may be shared over operand types. MDR unit 420, in various embodiments, tracks the speculative execution and retires ops (or flushes misspeculated ops). In various embodiments, reorder buffer 425 is used in tracking the program order of ops and managing retirement/flush.

In various embodiments, MDR unit 420 maintains three pointers usable for determining when to flush ops: a retired operations pointer, a branch and system resolve pointer, and a mild DSB flush pointer. The retired operations pointer, in various embodiments, points to the next instruction op in MDR unit 420 (or, more particularly, in reorder buffer 425) that is sequentially after the most recently retired instruction op. Consequently, the retired operations pointer may be incremented to point to the next instruction op in response to the retirement of an instruction op. A given instruction op may retire when it has been completed and its results are observable by the system as if executed in order. For example, a load operation targeting a peripheral 140 may retire when the requested data has been received by processor 125 from the peripheral 140 and it is the oldest outstanding operation. The branch and system resolve pointer, in various embodiments, points to the youngest instruction op for which previous branch instructions and potentially exception causing instructions have been resolved.

The mild DSB flush pointer, in various embodiments, points to an instruction op in the instruction sequence at which to flush when a mild DSB operation request 220 is received and there is at least one outstanding load/store operation targeting a memory address that is within the excluded memory region (e.g., the PCIe address space). The mild DSB flush pointer may identify an instruction op that is between the instruction ops pointed to by the retired operations pointer and the branch and system resolve pointer. In some embodiments, the mild DSB flush pointer points to the instruction op sequentially after the youngest load/store operation that has been completed/committed to memory, which can be younger than an instruction op associated with a peripheral request 210. (At various points, load/store operations are referred to as being younger or older than other load/store operations. A first operation is said to be younger than a second operation if that first operation is subsequent to the second operation in program order. Similarly, a first operation is older than a second operation if that first operation precedes the second operation in program order). But the pointed-to instruction op may be sequentially after any of the following: the youngest launched store operation directed to the excluded memory region, the youngest load operation retired from LDQ 438 (discussed below), the youngest store operation retired from STQ 436, or the youngest launched load operation to the excluded memory address region. Consequently, the mild DSB flush pointer may move past load/store operations as they complete/commit to memory due to either being hits on DCache 417 or fill responses from last level cache 205. In various embodiments, the mild DSB flush pointer may be valid or invalid based on whether there is an outstanding load/store operation that targets a memory address that is within the excluded memory region. The mild DSB flush pointer may be moved while in the invalid state and then set to the valid state when there is an outstanding load/store operation to the excluded memory region. As discussed below, when valid, the mild DSB flush pointer may be used by MDR unit 420 to determine when to perform a flush. In an embodiment, the reorder buffer 425 may track ops that were decoded concurrently as a unit, or group. In such embodiments, the above pointers may point to a group of ops. However, the operation described herein may generally proceed in the same fashion.

LSU 430, in various embodiments, is configured to execute memory operations from MDR unit 420. Generally, a memory operation (a memory op) is an instruction operation that specifies an access to memory, although that memory access may be completed in a cache such as DCache 417. Accordingly, a load memory operation may specify a transfer of data from a memory location to a register, while a store memory operation may specify a transfer of data from a register to a memory location. Load memory operations are referred to as load memory ops, load ops, or loads, and store memory operations are referred to as store memory ops, store ops, or stores. In some embodiments, the instruction set architecture implemented by processor 125 permits memory accesses to different addresses to occur out of order but may require memory accesses to the same address (or overlapping addresses, where at least one byte is accessed by both overlapping memory accesses) to occur in program order.

LSU 430 may implement multiple load pipelines ("pipes"). Each pipeline may execute a different load, independent and in parallel with other loads in other pipelines. Consequently, reservation station 432 may issue any number of loads up to the number of load pipes in the same clock cycle. Similarly, LSU 430 may implement one or more store pipes. The number of store pipes, however, does not need to equal the number of load pipes. Likewise, reservation station 432 may issue any number of stores up to the number of store pipes in the same clock cycle.

Load/store ops, in various embodiments, are received at reservation station 432, which may be configured to monitor the source operands of the load/store ops to determine when they are available and then issue the ops to the load or store pipelines, respectively. AGU/TLB 434 may be coupled to one or more initial stages of the pipelines mentioned earlier. Some source operands may be available when the operations are received at reservation station 432, which may be indicated in the data received by reservation station 432 from MDR unit 420 for the corresponding operation. Other operands may become available via execution of operations by other execute units 440 or even via execution of earlier load ops. The operands may be gathered by reservation station 432, or may be read from a register file 445 upon issue from reservation station 432 as shown in FIG. 4. In some embodiments, reservation station 432 is configured to issue load/store ops out of order (from their original order in the code sequence being executed by processor 125) as the operands become available.

AGU/TLB 434, in various embodiments, is configured to generate the address accessed by a load/store op when the load/store op is sent from reservation station 432. AGU/TLB 434 may further be configured to translate that address from an effective or virtual address created from the address operands of the load/store op to a physical address that may actually be used to address memory. After the memory address of the load/store op is translated at AGU/TLB 434 from a virtual memory address to a physical memory address, LSU 430 may compare that physical memory address with the excluded memory region. In some cases, this comparison is made when a load/store operation is being enqueued in STQ 436 or LDQ 438. If a load/store op is directed to the excluded memory region, then an indication may be sent to MDR unit 420 when a corresponding request directed to the excluded memory region is sent. In response to receiving that indication, MDR unit 420 may set the mild DSB flush pointer to a valid state. In some embodiments, AGU/TLB 434 is configured to generate an access to DCache 417.

STQ 436, in various embodiments, track stores from initial execution to retirement by LSU 430 and may be responsible for ensuring the memory ordering rules are not violated. The load operations may update an LDQ 438 entry preassigned to the load operations, and the store operations may update STQ 436, to enforce ordering among operations. The store pipes may be coupled to STQ 436, which is configured to hold store operations that have been executed but have not committed. STQ 436 may be configured to detect that a first load operation hits on a first store operation in STQ 436 during execution of the first load operation, and STQ 436 is configured to cause a replay of the first load operation based on the detection of a hit on the first store operation and a lack of first store data associated with the first store operation in the store queue.

LDQ 438, in various embodiments, track loads from initial execution to retirement by LSU 430. LDQ 438 may be responsible for ensuring the memory ordering rules are not violated (between out of order executed loads, as well as between loads and stores). In the event that a memory ordering violation is detected, LDQ 438 may signal a redirect for the corresponding load. A redirect may cause processor 125 to flush the load and subsequent ops in program order, and refetch the corresponding instructions. Speculative state for the load and subsequent ops is discarded and the ops may be refetched by fetch and decode unit 410 and reprocessed to be executed again.

Execute units 440, in various embodiments, include any types of execution units. For example, execute units 440 may include integer execution units configured to execute integer ops, floating point execution units configured to execute floating point ops, or vector execution units configured to execute vector ops. Generally, integer ops are ops that perform a defined operation (e.g. arithmetic, logical, shift/rotate, etc.) on integer operands and floating point ops are ops that have been defined to operate on floating point operands. Vector ops may be used to process media data (e.g. image data such as pixels, audio data, etc.). As such, each execution unit 440 may comprise hardware configured to perform the operations defined for those ops that that execution unit is defined to handle. Execution units 440 may generally be independent of each other, in the sense that each execution unit may be configured to operate on an op that was issued to that execution unit without dependence on other execution units 440. Different execution units 440 may have different execution latencies (e.g., different pipe lengths). Any number and type of execution units 440 may be included in various embodiments, including embodiments having one execution unit 440 and embodiments having multiple execution units 440.

CIF 450, in various embodiments, is responsible for communicating with the rest of the system including processor 125, on behalf of processor 125. For example, CIF 450 may be configured to request data for ICache 415 misses and DCache 417 misses. When the data is returned, CIF 450 may then signal the cache fill to the corresponding cache. For DCache fills, CIF 450 may also inform LSU 430 (and more particularly LDQ 438). In some cases, LDQ 438 may schedule replayed loads that are waiting on the cache fill so that the replayed loads forward the fill data as it is provided to DCache 417 (referred to as a fill forward operation). If the replayed load is not successfully replayed during the fill, then that replayed load may be subsequently scheduled and replayed through DCache 417 as a cache hit. CIF 450 may further writeback modified cache lines that have been evicted by DCache 417, merge store data for non-cacheable stores, etc. In various embodiments, CIF 450 further maintains a write counter that indicates a number of outstanding data requests issued to components outside of processor 125. Accordingly, when sending a peripheral request 210 to a peripheral 140, CIF 450 may increment the writer counter. The writer counter may be used to determine when to perform a flush in response to receiving a DSB operation request 220.

As discussed previously, a processor 125 may receive DSB operation requests 220 from other processors 125 of SOC 100. In various embodiments, a DSB operation request 220 is received at LSU 430 as part of a cache maintenance packet. The DSB operation request 220 may indicate whether a mild or strong DSB operation should be performed. In response to receiving the DSB operation request 220, LSU 430 may issue a flush request to MDR unit 420 to flush various circuits of processor 125. In response to receiving the request to flush, in various embodiments, MDR unit 420 freezes its branch and system resolve pointer. If a mild DSB operation is being performed and the mild DSB flush pointer is valid, then MDR unit 420 continues to retire ops and injects a flush when the retired operations pointer reaches the mild DSB flush pointer. If a mild DSB operation is requested but the mild DSB flush pointer is not in the valid state or if a strong DSB operation is requested, then MDR unit 420 injects a flush when the retired operations pointer reaches the branch and system resolve pointer. But if, while waiting for prior requests to finish, a request to an address within the excluded memory region is launched, then, in various embodiments, processor 125 switches to flushing when the retired operations pointer reaches the mild DSB flush pointer. As part of the flush, MDR unit 420 may flush a set of front-end circuits (not shown) and the execution pipelines of processor 125 and then issue an indication to LSU 430 that the pipelines have been flushed.

If the mild DSB flush pointer is invalid, then, in various embodiments, LSU 430 waits for all outstanding requests in CIF 450 (e.g., for CIF 450's write counter to equal zero) and all outstanding load/store operations stored in LDQ 438 and STQ 436 to drain/flush out. If the mild DSB flush pointer is valid, then LSU 430 waits for all outstanding requests in CIF 450 except for those directed to the excluded memory region and all outstanding load/store operations in LDQ 438 and STQ 436 except for those directed to the excluded memory region to drain/flush out. In various embodiments, LSU 430 then sends a DSB acknowledgement 230 to the DSB-issuing processor 125 indicating that the DSB operation is complete. LSU 430 may further send a restart response back to MDR 420 so that it can start re-fetching. If the flush occurs when the mild DSB flush pointer is reached, then, in various embodiments, all ops that are younger than the op pointed to by the mild DSB flush pointer are re-fetched and re-translated.

In various embodiments, loads/stores ops that are younger than a request to an address within the excluded memory region (e.g., a peripheral request 210) are allowed to make miss requests (e.g., to last level cache 205). But no miss request to last level cache 205 may be made that results in processor 125 transitioning into an irreversible machine state. For example, a younger non-excluded-memory-region, non-cacheable write request may not be sent if there is a pending request to an address within the excluded memory region. In some embodiments, separate virtual channels are used for requests to the excluded memory region and requests that are not to the excluded memory region. As a result, a younger non-excluded-memory-region, non-cacheable write request may be sent if there is a pending request to an address within the excluded memory region. All pending miss requests that are due to ops younger than the mild DSB flush pointer may be left as is and allowed to update DCache 417 any time after (including after sending the DSB acknowledgement 230). The data that is retrieved and stored in DCache 417 by the miss requests may be utilized by refetched demand ops that were not impacted by a set of translation lookaside buffer invalidation operations associated with the requested DSB operation. In various embodiments, in order to isolate younger requests to the exclude memory region from other older requests, those requests are sent only after all older demands (including cacheable and noncacheable requests) have completed or committed to the memory subsystem.

Figure 5:
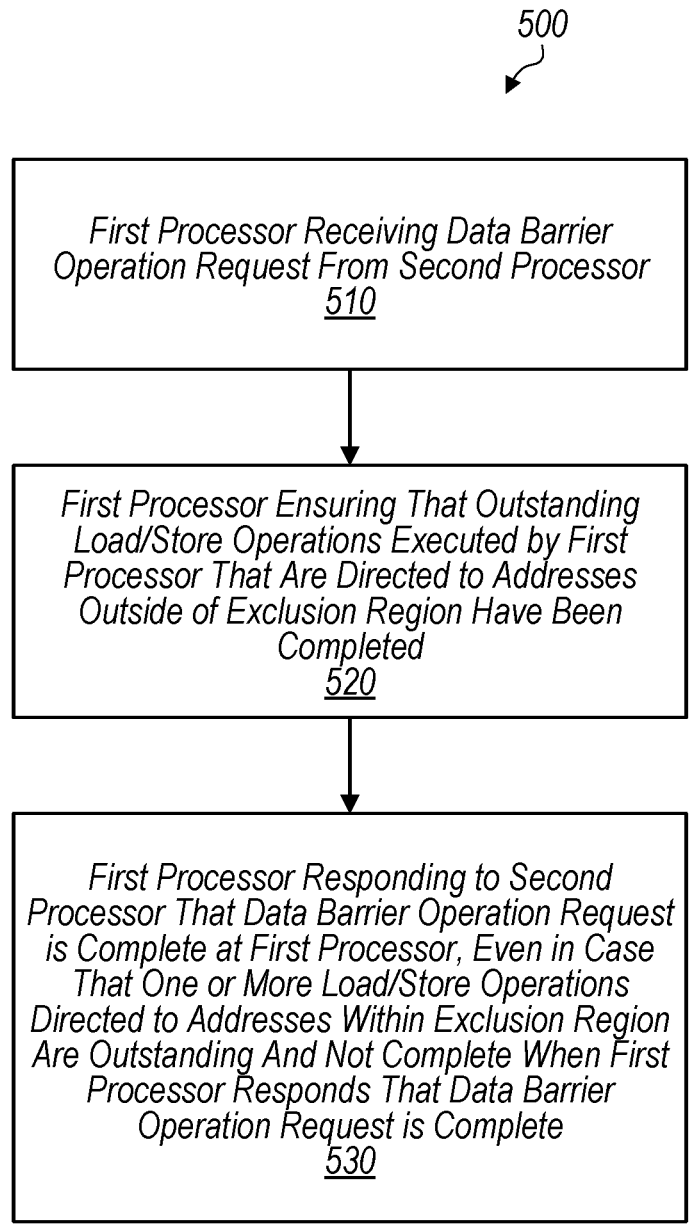
FIGS. 5-6 are flow diagrams illustrating example methods relating to processing a DSB operation request, according to some embodiments.

Turning now to FIG. 5, a flow diagram of a method 500 is shown. Method 500 is one embodiment of a method performed by a first processor (e.g., processor 125A) to complete a data barrier operation request (e.g., a DSB operation request 220) received from a second processor (e.g., processor 125B). In some cases, the first and second processors may be part of different compute complexes (e.g., compute complexes 120); in other cases, they may be part of the same compute complex. In some embodiments, method 500 may include more or less steps than shown. For example, the first processor may issue a data barrier operation request to the second processor.

Method 500 begins in step 510 with the first processor receiving the data barrier operation request from the second processor. In various embodiments, the first processor is configured to, while processing the first data barrier operation request, receive a second data barrier operation request from a third processor (e.g., processor 125C) of the plurality of processors. In response to the second data barrier operation request being of a different type than the first data barrier operation request (e.g., strong DSB versus mild DSB), the first processor may concurrently process the first and second data barrier operation requests. In response to the second data barrier operation request being of the same type as the first data barrier operation request (e.g., both mild DSBs), the first processor may serially process the first and second data barrier operations.

In step 520, the first processor ensures that outstanding load/store operations executed by the first processor that are directed to addresses outside of an exclusion region (e.g., PCIe address region) have been completed. In various embodiments, the first processor is configured to associate a given load/store operation with an indication (e.g., a bit) that identifies whether the load/store operation is directed to an address within the exclusion region. Accordingly, in order to ensure that the outstanding load/store operations directed to addresses outside of the exclusion region have been completed, the first processor may determine whether there is an outstanding load/store operation with an indication that identifies that the outstanding load/store operation is directed to an address outside the exclusion region. In some embodiments, the first processor is configured to determine whether a given outstanding load/store operation is directed to an address within the exclusion region based on a comparison between an address that is identified by the given outstanding load/store operation and an address range associated with the exclusion region. In some cases, the exclusion region includes a set of addresses mapped to an I/O device external to the plurality of processors.

In step 530, the first processor responds to the second processor that the data barrier operation request is complete at the first processor, even in the case that one or more load/store operations directed to addresses within the exclusion region are outstanding and not complete when the first processor responds that the data barrier operation request is complete. In various embodiments, the first processor is configured to maintain first and second flush pointers (e.g., the mild DSB flush pointer and the branch and system resolve pointer), each of which identifies a respective load/store operation at which to flush a load/store unit of the first processor. In response to a detection that the first data barrier operation request is a first one (e.g., a mild DSB) of two different types, the first processor may flush the load/store unit at the first flush pointer. In response to a detection that the first data barrier operation request is a second one (e.g., a strong DSB) of the two different types, the first processor may flush the load/store unit at the second flush pointer. In response to completing an outstanding load/store operation, the first processor may modify the first flush pointer to identify a load/store operation occurring next after the outstanding load/store operation in instruction order. In response to initiating a load/store operation that is directed to an address within the exclusion region, the first processor may set the first flush pointer (e.g., the mild DSB flush pointer) to a valid state that permits the first processor to flush the load/store unit at the first flush pointer.

Figure 6:
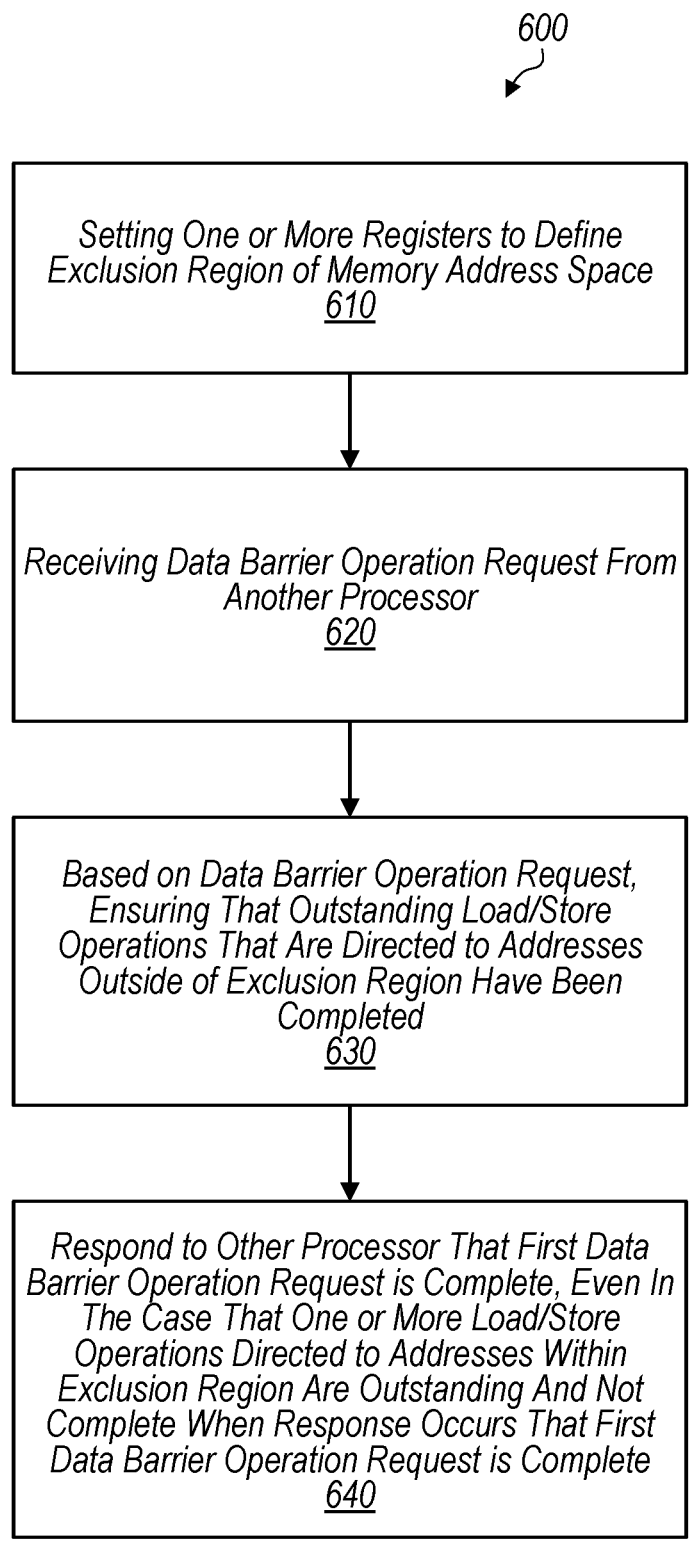

Turning now to FIG. 6, a flow diagram of a method 600 is shown. Method 600 is one embodiment of a method performed by a first processor (e.g., processor 125A) to complete a data barrier operation request (e.g., a DSB operation request 220) received from a second processor (e.g., processor 125B). In some embodiments, method 600 may include more or less steps than shown. For example, the first processor may issue a data barrier operation request to the second processor.

Method 600 begins in step 610 with the first processor setting one or more registers that are included in the first processor to define an exclusion region of a memory address space. In step 620, the first processor receives the first data barrier operation request from another, second processor. In some cases, while processing the first data barrier operation request, the first processor receives a second data barrier operation request from a third, different processor. Based on the second data barrier operation request being of a different type than the first data barrier operation request (e.g., one a mild DSB operation and the other a strong DSB operation), the first processor may concurrently process the first and second data barrier operation requests. As part of processing the second data barrier operation request, the first processor may ensure that all outstanding load/store operations executed by the first processor have been completed and then respond to the second processor that the second data barrier operation request is complete at the second processor.

In step 630, based on the first data barrier operation request, the first processor ensures that outstanding load/store operations executed by the first processor directed to addresses outside of the exclusion region have been completed. In some embodiments, the first processor maintains a first flush pointer and a second flush pointer. Based on the first data barrier operation request and there being at least one outstanding load/store operation directed to an address within the exclusion region, the first processor flushes a load/store unit (e.g., LSU 430) of the first processor at the first flush pointer (e.g., the mild DSB pointer). Based on the first data barrier operation request and there not being at least one outstanding load/store operation directed to an address within the exclusion region, the first processor flushes the load/store unit at the second flush pointer (e.g., the branch and resolve pointer). In step 640, the first processor responds to the second processor that the first data barrier operation request is complete at the first processor, even in the case that one or more load/store operations directed to addresses within the exclusion region are outstanding and not complete when first second processor responds that the first data barrier operation request is complete.

Figure 7:
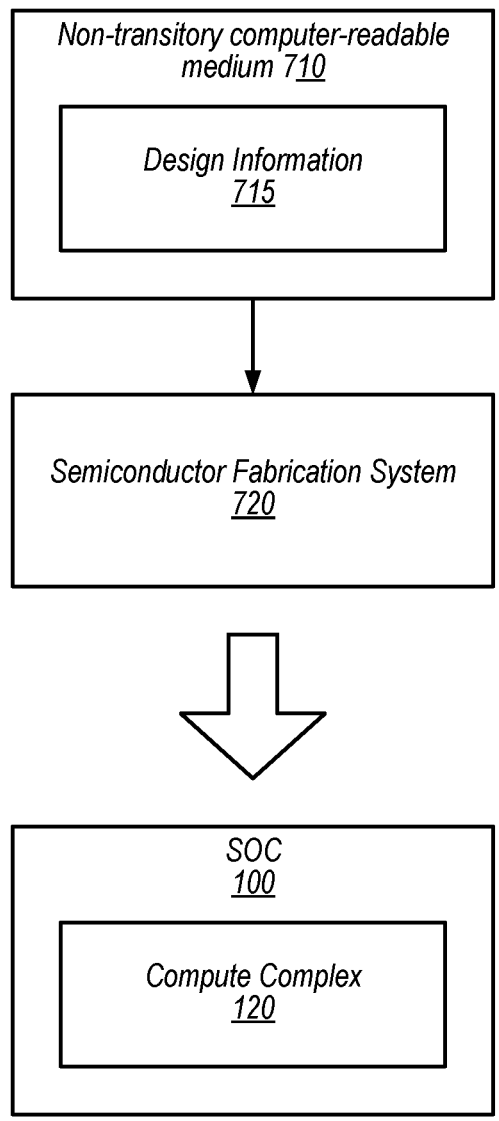
FIG. 7 is a block diagram illustrating an example process of fabricating at least a portion of an SOC, according to some embodiments.

Turning now to FIG. 7, a block diagram illustrating an example process of fabricating at least a portion of a SOC 100 is shown. The illustrated embodiment includes a non-transitory computer-readable medium 710, a semiconductor fabrication system 720, and a resulting fabricated SOC 100. As shown, non-transitory computer-readable medium 710 includes design information 715. In various embodiments, SOC 100 additionally or alternatively includes other circuits described above, such memory 110. In the illustrated embodiment, semiconductor fabrication system 720 is configured to process design information 715 and fabricate SOC 100.

Non-transitory computer-readable medium 710 may include any of various appropriate types of memory devices or storage devices. For example, non-transitory computer-readable medium 710 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 710 may include two or more memory mediums, which may reside in different locations (e.g., in different computer systems that are connected over a network).

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of SOC 100. The format of design information 715 may be recognized by at least one semiconductor fabrication system 720. In some embodiments, design information 715 may also include one or more cell libraries, which specify the synthesis and/or layout of SOC 100. In some embodiments, the design information is specified in whole or in part in the form of a netlist that specifies cell library elements and their connectivity. Design information 715, taken alone, may or may not include sufficient information for fabrication of a corresponding integrated circuit (e.g., SOC 100). For example, design information 715 may specify circuit elements to be fabricated but not their physical layout. In this case, design information 715 may be combined with layout information to fabricate the specified integrated circuit.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, SOC 100 is configured to operate according to a circuit design specified by design information 715, which may include performing any of the functionality described herein. For example, SOC 100 may include any of various elements described with reference to FIGS. 1-4. Furthermore, SOC 100 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of SOC 100 is performed. Design information 715 may be generated using one or more computer systems and stored in non-transitory computer-readable medium 710. The method may conclude when design information 715 is sent to semiconductor fabrication system 720 or prior to design information 715 being sent to semiconductor fabrication system 720. Accordingly, in some embodiments, the method may not include actions performed by semiconductor fabrication system 720. Design information 715 may be sent to semiconductor fabrication system 720 in a variety of ways. For example, design information 715 may be transmitted (e.g., via a transmission medium such as the Internet) from non-transitory computer-readable medium 710 to semiconductor fabrication system 720 (e.g., directly or indirectly). As another example, non-transitory computer-readable medium 710 may be sent to semiconductor fabrication system 720. In response to the method of initiating fabrication, semiconductor fabrication system 720 may fabricate SOC 100 as discussed above.

Figure 8:
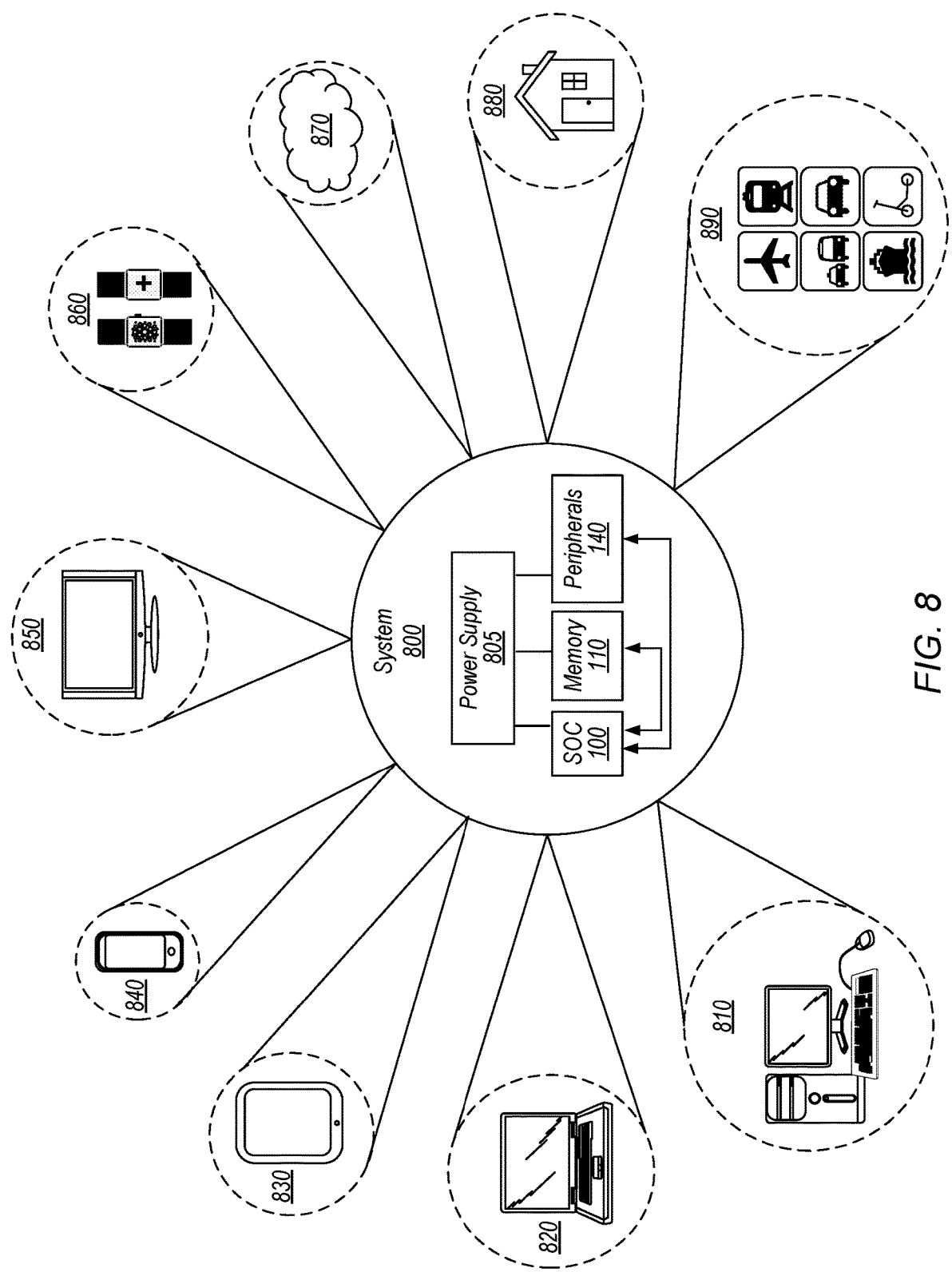
FIG. 8 is a block diagram illustrating an example SOC that is usable in various types of systems, according to some embodiments.

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SOC) 100 that is coupled to external memory 110, peripherals 140, and a power supply 805. Power supply 805 is also provided which supplies the supply voltages to SOC 100 as well as one or more supply voltages to the memory 110 and/or the peripherals 140. In various embodiments, power supply 805 represents a battery (e.g., a rechargeable battery in a smart phone, laptop or tablet computer, or other device). In some embodiments, more than one instance of SOC 100 is included (and more than one external memory 110 is included as well).

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (e.g., remotely located hardware and/or software resources). Still further, system 800 may be utilized in one or more devices of a home 880 other than those previously mentioned. For example, appliances within home 880 may monitor and detect conditions that warrant attention. For example, various devices within home 880 (e.g., a refrigerator, a cooling system, etc.) may monitor the status of the device and provide an alert to the homeowner (or, for example, a repair facility) should a particular event be detected. Alternatively, a thermostat may monitor the temperature in home 880 and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
   a first processor and a second processor that are communicatively coupled;
   wherein the first processor is configured to:
   issue a first data barrier operation request responsive to a detection of an occurrence of a particular event;
   wherein the second processor is configured to:
   receive the first data barrier operation request;
   ensure that outstanding load/store operations executed by the second processor that are directed to addresses outside of an exclusion region have been completed; and
   respond to the first processor that the first data barrier operation request is complete at the second processor, even in the case that one or more load/store operations that are directed to addresses within the exclusion region are outstanding and not complete when the second processor responds that the first data barrier operation request is complete.

2. The system of claim 1, wherein the second processor is configured to:
   receive a second data barrier operation request; and
   while processing the first data barrier operation request, concurrently process the first and second data barrier operation requests based on a detection that the second data barrier operation request is of a different type than the first data barrier operation request.

3. The system of claim 2, further comprising:
   a third processor communicatively coupled to the first and second processors, wherein the second processor is configured to receive the second data barrier operation request from the third processor.

4. The system of claim 2, wherein the second processor is configured to:
   serially process the first and second data barrier operation requests based on a detection that the second data barrier operation request is of the same type as the first data barrier operation request.

5. The system of claim 1, wherein the second processor is configured to:
   maintain a first flush pointer that identifies a load/store operation at which to flush a load/store unit (LSU) of the second processor in response to reception of a first type of data barrier operation request, wherein the first data barrier operation request is of the first type; and
   maintain a second flush pointer that identifies a load/store operation at which to flush the LSU in response to reception of a second type of data barrier operation request.

6. The system of claim 5, wherein the second processor is configured to:
   based on an issuance of a load/store operation directed to an address within the exclusion region, set the first flush pointer to a valid state that permits the second processor to flush the LSU at the first flush pointer.

7. The system of claim 1, wherein the second processor is configured to
   determine whether a particular outstanding load/store operation is directed to an address within the exclusion region based on a comparison between an address that is identified by the particular outstanding load/store operation and an address range associated with the exclusion region.

8. The system of claim 1, wherein the exclusion region includes a set of addresses mapped to an I/O device external to the first and second processors.

9. The system of claim 1, wherein the second processor is configured to:
   implement a first virtual channel for load/store operations directed to addresses outside of the exclusion region; and
   implement a second virtual channel for load/store operations directed to addresses within the exclusion region.

10. A method, comprising:
    receiving, by a first processor of a computer system, a first data barrier operation request from a second processor of the computer system;
    based on receiving the first data barrier operation request from the second processor, the first processor ensuring that outstanding load/store operations executed by the first processor that are directed to addresses outside of a memory exclusion region have been completed; and
    responding, by the first processor and to the second processor, that the first data barrier operation request is complete at the first processor, even in the case that one or more load/store operations directed to addresses within the memory exclusion region are outstanding and not complete when the first processor responds that the first data barrier operation request is complete.

11. The method of claim 10, further comprising:
    while processing the first data barrier operation request, the first processor:
    receiving a second data barrier operation request; and
    concurrently processing the first and second data barrier operation requests in response to the second data barrier operation request being of a different type of barrier operation request than the first data barrier operation request.

12. The method of claim 10, further comprising:
    while processing the first data barrier operation request, the first processor:
    receiving a second data barrier operation request; and
    serially processing the first and second data barrier operation requests in response to the second data barrier operation request being of the same type of barrier operation request as the first data barrier operation request.

13. The method of claim 10, further comprising:
    in response to receiving a second data barrier operation request that instructs the first processor to include outstanding load/store operations that are directed to addresses within the memory exclusion region when considering when to respond to the second processor, the first processor:
ensuring that all outstanding load/store operations executed by the first processor have been completed; and
responding to the second processor that the second data barrier operation request is complete at the first processor.

14. The method of claim 10, further comprising:
maintaining, by the first processor, a first flush pointer that identifies a location within an instruction sequence at which to flush a load/store unit (LSU) of the first processor in response to receiving the first data barrier operation request; and
maintaining, by the first processor, a second flush pointer that identifies a different location within the instruction sequence at which to flush the LSU in response to receiving a data barrier operation request of a different type than the first data barrier operation request.

15. The method of claim 14, further comprising:
modifying, by the first processor, the first flush pointer to identify another location within the instruction sequence in response to initiating a load/store operation directed to a memory address within the memory exclusion region.

16. The method of claim 14, further comprising:
completing, by the first processor, a load/store operation; and
in response to completing the load/store operation, the first processor updating the first flush pointer to identify a load/store operation occurring next after the completed load/store operation in instruction order.

17. A non-transitory computer readable medium having stored thereon design information that specifies a circuit design in a format recognized by a fabrication system that is configured to use the design information to fabricate a hardware integrated circuit that comprises:
a plurality of processors that are communicatively coupled;
wherein a first processor of the plurality of processors is configured to:
issue a first data barrier operation request responsive to a detection of an occurrence of a particular event;
wherein a second processor of the plurality of processors is configured to:
receive the first data barrier operation request;
ensure that outstanding load/store operations executed by the second processor that are directed to addresses outside of an exclusion region have been completed; and
respond to the first processor that the first data barrier operation request is complete at the second processor, even in the case that one or more load/store operations that are directed to addresses within the exclusion region are outstanding and not complete when the second processor responds that the first data barrier operation request is complete.

18. The non-transitory computer readable medium of claim 17, wherein the second processor is configured to:
receive a second data barrier operation request; and
while processing the first data barrier operation request, concurrently process the first and second data barrier operation requests based on a detection that the second data barrier operation request is of a different type than the first data barrier operation request.

19. The non-transitory computer readable medium of claim 17, wherein the second processor is configured to:
maintain a first flush pointer and a second flush pointer;
in response to receiving the first data barrier operation request and based on there being at least one outstanding load/store operation directed to an address within the exclusion region, flush a load/store unit (LSU) of the second processor at the first flush pointer; and
in response to receiving the first data barrier operation request and based on there not being at least one outstanding load/store operation directed to an address within the exclusion region, flush the LSU at the second flush pointer.

20. The non-transitory computer readable medium of claim 19, wherein the second processor is configured to:
in response to a completion of a particular outstanding load/store operation, modify the first flush pointer to identify a load/store operation occurring next after the particular outstanding load/store operation in instruction order.

21. A system, comprising:
a first processor and a second processor that are communicatively coupled;
wherein the first processor is configured to:
issue a first data barrier operation request responsive to a detection of an occurrence of a particular event;
wherein the second processor is configured to:
receive the first data barrier operation request;
receive a second data barrier operation request after reception of the first data barrier operation request; and
concurrently process the first and second data barrier operation requests based on a detection that the second data barrier operation request is of a different type than the first data barrier operation request.

* * * * *